Oct. 24, 1933.    J. McK. BALLOU ET AL    1,931,809
AIRPLANE
Filed Sept. 20, 1932
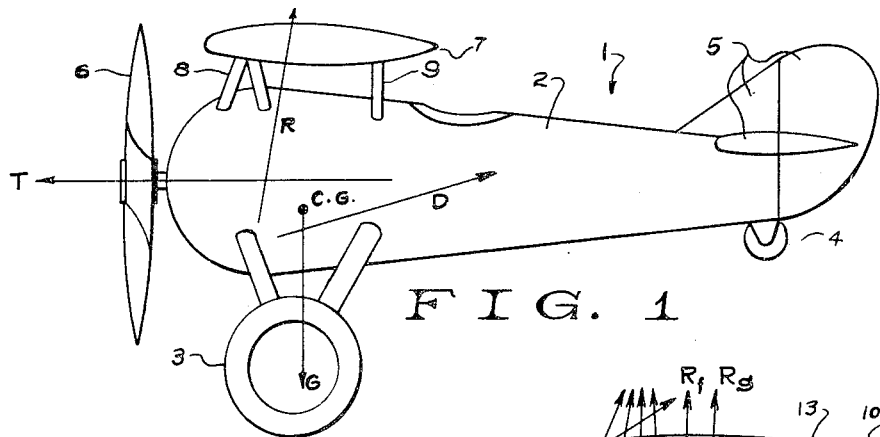
FIG. 1
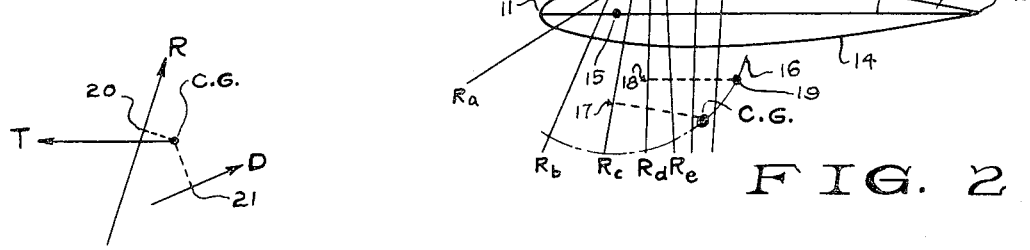
FIG. 2
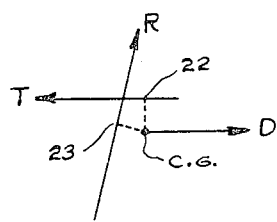
FIG. 3
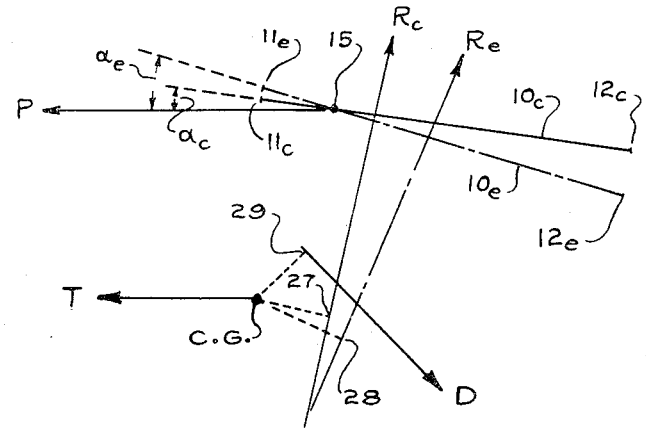
FIG. 6
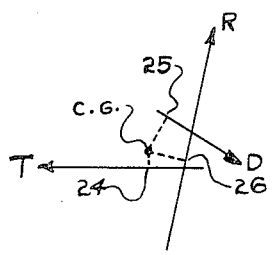
FIG. 4
FIG. 5
INVENTORS.
John McK Ballou.
Vernon M Balzer Patented Oct. 24, 1933

1,931,809

UNITED STATES PATENT OFFICE 1,931,809

AIRPLANE

John McK. Ballou, Weston, Conn., and Vernon W. Balzer, Jamaica, N. Y.

Application September 20, 1932
Serial No. 633,968

9 Claims. (Cl. 244—12)

This invention relates to airplanes in general, and more specifically to adjustable wing airplanes whose angles of attack are established by tipping their wings relative to their fuselages.

An object of this invention is to provide an airplane with adjustable wings wherein longitudinal control is accomplished by adjustably tipping the wings relative to the center of gravity of the airplane.

Another object is to provide such an airplane with a system of balanced moments to maintain stable equilibrium in any adjusted position of the wings.

Other objects will be apparent by reference to the annexed drawing, descriptions and claims.

Others have made airplanes of the adjustable wing class that, in any position of adjustment, are in unstable equilibrium, and therefore of very limited usefulness. Still others have made airplanes of the adjustable wing class having the wings of such a design and so positioned relative to the center of gravity of the airplane that the line of action of the reaction of the wings will always pass thru the center of gravity, thereby securing equilibrium, some such airplanes being in stable, and some in unstable equilibrium. However, the latitude of design for such airplanes is very limited, and many desirable models are not feasible as embodiments of these types.

The present invention overcomes all of these difficulties, restrictions and imperfections and will be best understood by reference to the ensuing description of the drawing, wherein:

Fig. 1 is a side elevation of an airplane embodying this invention, showing the lines of action of the various forces and resistances acting thereon.

Fig. 2 is a profile of a wing suited to this invention, with a diagram showing the locations of the reactions for different angles of attack.

Fig. 3 is a diagram showing a balance of moments on an embodiment.

Fig. 4 is a diagram showing a balance of moments on another embodiment.

Fig. 5 is a diagram showing a balance of moments on another embodiment.

Fig. 6 is a diagram showing a balance of moments on another embodiment analyzed in two different positions of adjustment.

In the airplane shown in Fig. 1, a fuselage or body structure 1 comprises a body portion 2, a chassis 3, a tail wheel 4, and an empennage 5. A thrust force whose line of action is represented by T is furnished by a propeller 6 or other suitable device driven by any well known source of power. Right and left wing structures 7 are mounted on the fuselage 1 by a cabane 8 or other appropriate structure to which the wings 7 are pivoted and rear supports 9 sustain the rear portions of the wings 7. These rear supports 9 are movable up and down to tip the wings 7 on the cabane 8. Any well known mechanism or electric or hydraulic device under the control of the pilot may be used to adjustably tip the wings 7 thru the agency of the supports 9, and the details of such well known devices will not be described here, as the invention is not directed to any particular means for adjustably tipping the wings 7.

Gravity G, or any combination of gravity with inertial or accelerating forces affecting the whole mass of the airplane invariably have lines of action passing thru the center of gravity C. G. of the airplane. In view of the fact that such forces have lines of action passing always thru the center of gravity C. G., they can not induce moments about the center of gravity C. G., and therefore they can not exert any tendency to rotate the airplane relative to its path, and they will be disregarded in the ensuing description. They must be taken into account in order to obtain a balance of forces for rectilinear equilibrium, but rectilinear accelerations are not of interest in this description which deals primarily with angular equilibrium and a balance of moments.

The thrust of the propeller 6, directed along line of action T imparts a forward motion to the airplane. The wings 7 offer a reaction to this forward motion and the line of action of this reaction is represented by R, which it will be noted, in the flight condition represented in Fig. 1, is predominantly upward and somewhat rearward, therefore tending to sustain the weight of the airplane and at the same time somewhat opposing its forward motion. In addition to the reaction of the wings, there is a resistance offered by the fuselage to the forward motion of the airplane thru the air. This resistance has a line of action D, which it is evident, may be inclined upward as shown, or may be directed parallel to the longitudinal axis of the fuselage, or it may be inclined downward, depending on the shape and disposition of the elements comprising the fuselage. An airplane could be designed so that any one or more of the lines of action T, R, and D might pass thru the center of gravity C. G. However, this invention is directed to constructions wherein the line of action of the aerodynamic reaction on the wings R shall always pass outside the center of gravity C. G., and the airplane shall at the same time be always in stable angular equilibrium.

In Fig. 2 there is a wing profile 7 having a chord 10, a leading edge 11 and a trailing edge 12. Here, the upper camber 13 and the lower camber 14 are symmetrical about the chord 10. This is not essential to the present invention, as there are many asymmetrical profiles that are equally advantageous in possessing the properties that are to be disclosed forthwith. However, as there are many symmetrical profiles that are useful for the present purposes, such a representative profile is used here for illustration.

As hereinbefore stated, the wings offer a reaction to their forward motion. As is well known to those skilled in the art, the position of the line of action of this reaction relative to the chord 10 of the wing 7 depends on the angle of attack, or the acute angle between the wing chord 10 and the path of the airplane wing relative to the air in which it is enveloped. Two different angles of attack are shown in Fig. 6. $\alpha_c$ and a higher angle of attack $\alpha_e$, the line P representing the path of the airfoil chord $10_c$ and $10_e$. In the symmetrical profile shown in Fig. 2, the line of action of the reaction R is directed along the chord 10 when the angle of attack is 0°. When the wing is flying at a small angle of attack, $a°$, the reaction has a line of action $R_a$, inclined upwards and rearwards to the chord 10. If the angle of attack be increased to $b°$, the line of action $R_a$ ceases to exist and the reaction is directed along a new line of action $R_b$, inclined more steeply upward toward the chord 10. Similarly, $R_c$ replaces $R_b$ when the angle of attack is increased to $c°$, and so on for $R_d$ at $d°$, $R_e$ at $e°$, $R_f$ at $f°$ and $R_g$ at $g°$, consecutively larger angles of attack respectively. Thus in Fig. 2 if we speak of the leading edge 11 as being in front of the wing 7, and the trailing edge 12 as being in the rear, then the lines of action of the wing reactions progress consecutively from front to rear as the angle of attack is increased, provided we remain under the chord 10. Above the chord 10, it is seen that $R_a$ crosses $R_b$, $R_c$, etc. The region or zone wherein any of these lines of action R progress from rear to front as the angle of attack is increased is not suited to this invention, because such a progression would be conducive to unstable equilibrium. This invention requires that there be a zone wherein the lines of action $R_a$, $R_b$, etc. progress consecutively from front to rear as the angle of attack is increased. We shall designate the range of angles of attack at which it is desired to fly in any particular design as the flying range; and thus, a wing having the requisite properties for the present invention is described as a wing of the class having a zone wherein the lines of action of aerodynamic reactions progress consecutively from front to rear as the angle of attack is increased thruout the flying range.

If such a wing be pivoted at some suitable point, 15, so that its chord can be tipped or rocked up and down about the point 15, and the center of gravity of the airplane C. G. be placed in a fixed location relative to the fuselage 1 so that the chord 10 can be tipped relative to the center of gravity C. G. simultaneously with a change in angle of attack, as shown in Fig. 2, regardless of the angle of attack, the line of action of the wing reaction corresponding to the angle of attack will induce a clockwise moment about the center of gravity C. G. The arc 16 shows the relative movement between the wing 7 and the center of gravity C. G.

To further illustrate the nature of this invention, suppose the airplane to be flying at an angle of attack of $c°$, and therefore the line of action $R_c$ would be in existence, and the moment arm of the moment induced by the reaction corresponding to $c°$ angle of attack would be the pendendicular distance from $R_c$ to the center of gravity C. G., or the length of the line 17—C. G., and its direction would be clockwise, tending to increase the angle of attack. If, now, the wing 7 be tipped about the axis 15 in a clockwise direction until it has moved relative to the center of gravity C. G. sufficient to bring the center of gravity C. G. along the arc 16 to the new location 19, having 15 for its center, and if the angle thru which the wing 7 has been tipped is just sufficient to increase the angle of attack from $c°$ to $d°$, then the reaction of the wing 7 will be directed along a new line of action $R_d$, and the moment arm of this new reaction will be measured by the perpendicular distance from $R_d$ to the new location 19, of the center of gravity, or the length of the line 18—19. To avoid confusion here, it is well if the relative nature of the diagram in Fig. 2 be emphasized. In reality, the center of gravity C. G. of the airplane has a fixed location relative to the fuselage 1, and the relation between the wing 7 and the center of gravity C. G. is altered by tipping the wing 7 about the axis 15. However, the complication of any attempt to show this tipping by redrawing the wing 7 in its successive new positions would lead to an obscuring of the figure that might prove misleading. In Fig. 6, two of the positions are shown by a redrawing as will be described later. In view of the fact that only the relative positions are of interest, the drawing shows the center of gravity C. G. as being swung on the arc 16, rather than showing the wing 7 tipped on its axis 15, and the various lines of action $R_a$, $R_b$, etc. tipped with it. These lines, it should be remembered, show the locations and directions of the wing reactions relative to the wing chord 10, and it is clear, if the wing 7 were tipped, these lines of action $R_a$, $R_b$, etc. would be tipped with it. Also, it should be reiterated, these lines of action $R_a$, $R_b$, etc. are not co-existant. Never can more than one of them be in existence at any instant. Only the one corresponding to the angle of attack at which the wing is flying will be in existence. Now, to return to the center of gravity, C. G. in its new position 19, in this case the relations have been so chosen that the length of the moment arm 18—19 is equal to the length of the moment arm 17—C. G. It is clear without further elaboration that the pivot axis 15 and the center of gravity C. G. may each be so positioned relative to the wing diagram and to each other as to maintain the successive moment arms constant, as the wing 7 is tipped relative to the center of gravity C. G., and the various angles of attack are established. The actual diagram showing the various lines of action as shown in Fig. 2 is obtained by calculations based on wind tunnel tests as is well known to those skilled in the art. It is also clear that the pivot axis 15 and the center of gravity C. G. may be so positioned as to cause the lengths of these moment arms to increase or decrease as successive increasing angles of attack are established. The present invention is not restricted to any one of these designs. The essential feature is to maintain the moments of the wing's reactions R about the center of gravity C. G. always in the same direction. That is, if one moment, for example that of $R_c$ about the center of gravity C. G. be clockwise, the moments of all the other reactions, $R_b$, $R_f$ etc. about the center of gravity should all be clockwise, as the various angles of attack, $a°$, $b°$, $f°$ etc. are respectively established by tipping the wing 7 about the pivot axis 15; and if any one of these moments be counterclockwise, all the others should be counterclockwise.

If the moments discussed in the preceding paragraph were not balanced by another moment or other moments, the airplane would not be in angular equilibrium, and the angle of attack at which it was flying would therefore be in a state of change. This introduces the next feature of this invention. If the moment of the wing reaction in any established condition of angle of attack be clockwise, there must be an equal and counterclockwise moment to balance it and vice-versa. For this purpose there are available two separate sources of moment. The resistance of the fuselage is directed along some line of action D, and we may locate the center of gravity C. G. relative to the fuselage 1 so as to always induce a moment counter to the moment induced by the wing reaction to gain equilibrium. The other source of counter moment to balance the wing reaction moment is the thrust from the source of power, directed along a line of action T. Either the thrust line T, or the line of action of the fuselage resistance D may be designed to pass thru the center of gravity C. G., and therefore exert no balancing influence, the other being alone used to balance the moment of the wing reaction. In fact, with different designs, it is an advantage in certain instances to balance the wing reaction moment with the thrust moment alone, and in other instances to balance it with the fuselage resistance moment alone, while it is sometimes best to use a combination of the two. Therefore, the present invention is not restricted to either alone or to both in combination, but all three are included in the scope of this invention.

Fig. 3 shows a balance of moments, the outlines of fuselage, wing etc. being omitted for simplicity of illustration, of a system where the wing reaction R passes forward of the center of gravity C. G., the thrust line T passes thru the center of gravity C. G., and the fuselage resistance D passes under the center of gravity C. G. Here, the moment arm of the fuselage resistance 21—C. G. is longer than that of the wing reaction 20—C. G., because in this design, the magnitude of the fuselage resistance D is less than that of the wing reaction R, and the smaller force multiplied by the greater distance is equal to the greater force multiplied by the shorter distance.

In Fig. 4, the fuselage resistance is directed along a line of action D that passes thru the center of gravity C. G., and therefore exerts no influence on the balance. The wing reaction, directed along line of action R has a moment arm 23—C. G. and its clockwise moment is balanced by the counterclockwise moment of the thrust whose line of action is T and whose moment arm is 22—C. G.

In Fig. 5, the wing reaction, having the line of action R exerts a counterclockwise moment, having a moment arm 26—C. G. This moment is balanced by the sum of the two clockwise moments exerted by the thrust whose line of action is T, and whose moment arm is 24—C. G., and the fuselage resistance whose line of action is D and whose moment arm is 25—C. G.

In Fig. 6 is shown an analysis of a design wherein the line of action of the thrust T, passes thru the center of gravity C. G. The line of action of the fuselage resistance D passes outside the center of gravity C. G. with a moment arm 29—C. G. and induces a clockwise moment. The wing chord is shown in two different relative positions, one of which is $10_c$, with the leading edge at $11_c$ and the trailing edge at $12_c$. When in this position, it forms the acute angle $a_c$ with its path relative to the air, P, and therefore, $a_c$ is its angle of attack. When the angle of attack is $a_c$ the line of action of the wing reaction is $R_c$ which passes outside the center of gravity C. G. with a moment arm 27—C. G., and its moment about the center of gravity C. G. is counterclockwise, balancing the clockwise moment induced by the fuselage resistance whose line of action is D and whose moment arm is 29—C. G. The airplane is thus in equilibrium. The progression of the lines of action of wing reactions being from front to rear while the angle of attack is increased, as shown in Fig. 2, and explained above, the airplane is in stable equilibrium, because any rotational movement of the whole airplane which changes its angle of attack brings into existence a new wing reaction whose moment about the center of gravity C. G. is out of balance with the moment of the fuselage resistance in a direction to tend to return the angle of attack to $a_c$.

The wing is now adjustably tipped about the pivot axis 15 until its chord is at $10_e$ with its leading edge at $11_e$ and its trailing edge at $12_e$. The path in this case has not been changed relative to the air (altho the path of the airplane relative to the earth may or may not have been changed), and thus, in the diagram of Fig. 6 the angle of attack has been increased to $a_e$, which entails the creation of a new wing reaction whose line of action is $R_e$, having a moment arm 28—C, G, and a counterclockwise moment about the center of gravity C. G., of a magnitude sufficient to balance the clockwise moment of the fuselage resistance whose line of action is D. Thus, in the new position of adjustment with the angle of attack $a_e$ the airplane is again in stable equilibrium. In fact, in any position of adjustment for any angle of attack within the flying range, the airplane will be in stable equilibrium.

It is of interest here to note that in view of the fact that the thrust line T passes thru the center of gravity in the design shown in Fig. 6, it has no influence on the equilibrium of the airplane in pitch, and therefore it may be removed without changing the fact that the airplane is in stable equilibrium in any setting for angle of attack. This condition prevails in a glide, for in a glide the thrust with line of action T has a zero magnitude, and the balance remains as described above. This is not always desirable, and constructions wherein the thrust influences balance have been described under Figs. 4 and 5.

There is still another design that is of value which consists of a character of diagram of lines of action of wing reactions, a point or axis of pivotal connection location, and thrust and fuselage resistance moments so coordinated that the angle of attack change by tipping the wing 7 relative to the fuselage 1 is not equal to the angular change to bring corresponding lines of action into positions to induce equal and opposite moments to balance the thrust and fuselage resistance moments. In such a design, when a condition of unbalance is caused by an adjustment of the wing 7 relative to the fuselage 1, the whole airplane will tip about its center of gravity C. G. until a new trim position is established wherein there is a balance of moments, and the airplane finds itself again in stable equilibrium.

Such a design is sometimes desired, as it is conducive toward maintaining the fuselage more nearly horizontal regardless of its path relative to the air under certain conditions, such as flying under varying magnitudes of thrust.

For the sake of clarity of explanation, all of the foregoing has been directed toward a two-dimensional system, the lateral dimension of the airplane having been ignored. Now that the general theory of the present invention has been elucidated, the idea of this third dimension and its influence can be easily understood by considering the lines of action R as lying in planes perpendicular to the plane of the drawing. The center of gravity C. G. is actually a point, and the fuselage resistance D is properly considered as directed along a line, but if the wings are separately movable as right and left units, their actual lines of action of aerodynamic reactions would be laterally outside of the fuselage, and we can best consider them in terms of laterally extending planes containing the actual lines of action. Then, if the center of gravity should have a certain relation to one of these planes, its effects would be the same longitudinally as the effects described for the two-dimensional system in the foregoing discussion.

It will be obvious to those skilled in the art that slight modifications to the embodiments hereinbefore described may be made without impairing the general arrangements and functionings of the elements thereof, and this invention is to be construed as consisting of the general features of the described embodiments, and their spirit, rather than the details used for clarity of description.

Having described our invention we claim:

1. A flying machine having a center of gravity, comprising a body structure the line of action of whose aerodynamic resistance is located outside of said center of gravity in a certain rotational direction, a source of thrust whose line of action is located outside of said center of gravity, and right and left wing structures, each of the class having a zone wherein the lines of action of aerodynamic reactions are consecutively located progressively from front to rear with increase in angle of attack thruout the flying range, a supporting structure connecting said wing structures with said body structure including bearings with their axes disposed along laterally extending lines relative to said body structure, and adjusting means operable to vary the inclinations of said wing structures relative to the body structure about said bearings, said supporting structure being positioned with each in turn of said lines of action of aerodynamic reactions lying in laterally extending planes falling outside of said center of gravity in a counter rotational direction from that of the line of action of said aerodynamic resistance, and said zone being located in the same level as said center of gravity.

2. A flying machine having a center of gravity, comprising a body structure the line of action of whose aerodynamic resistance is located outside of said center of gravity in a certain rotational direction, right and left wing structures each of the class having a zone wherein the lines of action of aerodynamic reactions are consecutively located progressively from front to rear with increase in angle of attack thruout the flying range, a supporting structure connecting said wing structures with said body structure including bearings with their axes disposed along laterally extending lines relative to said body structure, and adjusting means operable to vary the inclinations of said wing structures relative to said body structure about said bearings, said supporting structure being positioned with each in turn of said lines of action of aerodynamic reactions lying in laterally extending planes in a counter rotational direction from that of the line of action of said aerodynamic resistance, and said zone being located in the same level as said center of gravity.

3. A flying machine having a center of gravity, comprising a body structure the line of action of whose aerodynamic resistance is located above said center of gravity, and right and left wing structures, each of the class having a zone wherein the lines of action of aerodynamic reactions are consecutively located progressively from front to rear as the angle of attack is increased thruout the flying range, a supporting structure connecting said wing structures with said body structure including bearings with their axes disposed along laterally extending lines relative to said body structure, and adjusting means operable to vary the angles of said wing structures relative to the longitudinal axis of said body structure about said bearings, said supporting structure being positioned with said lines of action of aerodynamic reactions lying in laterally extending planes falling behind said center of gravity as a wing is adjusted establishing the angle of attack corresponding to any one of said lines of action of aerodynamic reactions, and said zone being located in the same level as said center of gravity.

4. A flying machine having a center of gravity, comprising a body structure the line of action of whose aerodynamic resistance is located below said center of gravity, and right and left wing structures, each of the class having a zone wherein the lines of action of aerodynamic reaction are located consecutively from front to rear as the angle of attack is increased thruout the flying range, a supporting structure connecting said wing structures with said body structure including bearings with their axes disposed along laterally extending lines relative to said body structure, and adjusting means operable to vary the inclinations of said wing structures relative to said body structure about said bearings, said supporting structure being positioned with said lines of action of aerodynamic reactions lying in laterally extending planes falling in advance of said center of gravity as a wing is adjusted establishing the angle of attack corresponding to any one of said lines of action of aerodynamic reactions, and said zone being located in the same level as said center of gravity.

5. A flying machine having a center of gravity, comprising a body structure, a source of thrust whose line of action is located outside of said center of gravity in a certain rotational direction, right and left wing structures, each of the class having a zone wherein the lines of action of aerodynamic reactions are consecutively located progressively from front to rear as the angle of attack is increased thruout the flying range, a supporting structure connecting said wing structures with said body structure including bearings with their axes disposed along laterally extending lines relative to said body structure, and adjusting means operable to vary the inclinations of said wing structures relative to said body structure about said bearings, said supporting structure being located with each in turn of said lines of action of aerodynamic reactions lying in laterally extending planes falling outside of said center of gravity in a counter rotational direction from that of the line of action of said thrust, and said zone being located in the same level as said center of gravity.

6. A flying machine having a center of gravity, comprising a body structure, a source of thrust whose line of action is located below said center of gravity, and right and left wing structures, each of the class having a zone wherein the lines of action of aerodynamic reactions are consecutively located progressively from front to rear as the angle of attack is increased thruout the flying range, a supporting structure connecting said wing structures with said body structure including bearings with their axes disposed along laterally extending lines relative to said body structure, and adjusting means operable to vary the inclinations of said wing structures relative to the body structure about said bearings, said supporting structure being positioned with said lines of action of aerodynamic reactions lying in laterally extending planes falling behind said center of gravity as a wing is adjusted establishing the angle of attack corresponding to any one of said lines of action of aerodynamic reactions, and said zone being located in the same level as said center of gravity.

7. A flying machine having a center of gravity, comprising a body structure, a source of thrust whose line of action is located above said center of gravity, and right and left wing structures, each of the class having a zone wherein the lines of action of aerodynamic reactions are consecutively located progressively from front to rear as the angle of attack is increased thruout the flying range, a supporting structure connecting said wing structures with said body structure including bearings with their axes disposed along laterally extending lines relative to said body structure, and adjusting means operable to vary the inclinations of said wing structures relative to the body structure about said bearings, said supporting structure being positioned with said lines of action of aerodynamic reactions lying in laterally extending planes falling in advance of said center of gravity as a wing is adjusted establishing the angle of attack corresponding to any one of said lines of action of aerodynamic reactions, and said zone being located in the same level as said center of gravity.

8. A flying machine having a center of gravity, comprising a body structure the line of action of whose aerodynamic resistance is located outside of said center of gravity in a certain rotational direction, a unitary aerodynamic sustaining structure of the class having a zone wherein the lines of action of aerodynamic reactions are consecutively located progressively from front to rear with increasing angles of attack thruout the flying range, a supporting structure connecting said sustaining structure with said body structure including bearings with their axes disposed along a laterally extendng line relative to said body structure, and adjusting means operable to vary the inclination of said sustaining structure relative to said body structure about said bearings, said supporting structure being positioned with each in turn of said lines of action of aerodynamic reactions falling outside of said center of gravity in a counter rotational direction from that of the line of action of said aerodynamic resistance, and said zone being located in the same level as said center of gravity.

9. A flying machine having a center of gravity, comprising a body structure, a source of thrust whose line of action is located outside of said center of gravity in a certain rotational direction, a unitary aerodynamic sustaining structure of the class having a zone wherein the lines of action of aerodynamic reactions are consecutively located progressively from front to rear with increasing angles of attack thruout the flying range, a supporting structure connecting said sustaining structure with said body structure including bearings with their axes disposed along a laterally extending line relative to said body structure, and adjusting means operable to vary the inclination of said sustaining structure relative to said body structure about said bearings, said supporting structure being positioned with each in turn of said lines of action of aerodynamic reactions falling outside of said center of gravity in a counter rotational direction from that of the line of action of said thrust, and said zone being located in the same level as said center of gravity.

JOHN McK. BALLOU.
VERNON W. BALZER.